United States Patent [19]
Birkholtz

[11] 3,866,157
[45] Feb. 11, 1975

[54] LOAD CELL
[75] Inventor: Gottfried Birkholtz, Weiterstadt, Germany
[73] Assignee: Carl Schenck AG, Darmstadt, Germany
[22] Filed: Apr. 19, 1973
[21] Appl. No.: 352,560

[30] Foreign Application Priority Data
Sept. 12, 1972 Germany............................ 2244615

[52] U.S. Cl.................................. 338/5, 73/141 A
[51] Int. Cl. .............................................. G01l 1/22
[58] Field of Search .................................. 338/2–6; 73/88.5 R, 141 A

[56] References Cited
UNITED STATES PATENTS
| | | | |
|---|---|---|---|
| 3,453,582 | 7/1969 | Birkholtz ................................ | 338/5 |
| 3,513,431 | 5/1970 | Kovacs.................................... | 338/5 |
| 3,643,502 | 2/1972 | Birkholtz .......................... | 73/141 A |

OTHER PUBLICATIONS
"German printed application," Birkholtz, 1,139,668, Nov. 15, 1962.
"German printed application," Birkholtz, 1156580, Oct. 31, 1963.

*Primary Examiner*—C. L. Albritton
*Attorney, Agent, or Firm*—Wolfgang G. Fasse; Willard W. Roberts

[57] ABSTRACT
A load cell has a ring shaped deformation element with a triangular cross section, the apex of the cross section extending outwardly. Thin walled tubes extend in opposite directions between an intermediate section circumferentially joined to the outer edge of the deformation element, and respective coupling flanges. Mechanical-electrical transducers are mounted on the faces of the ring shaped element, or within a bore extending therethrough. One or both of the thin walled tubes may be frusto-conical.

13 Claims, 3 Drawing Figures

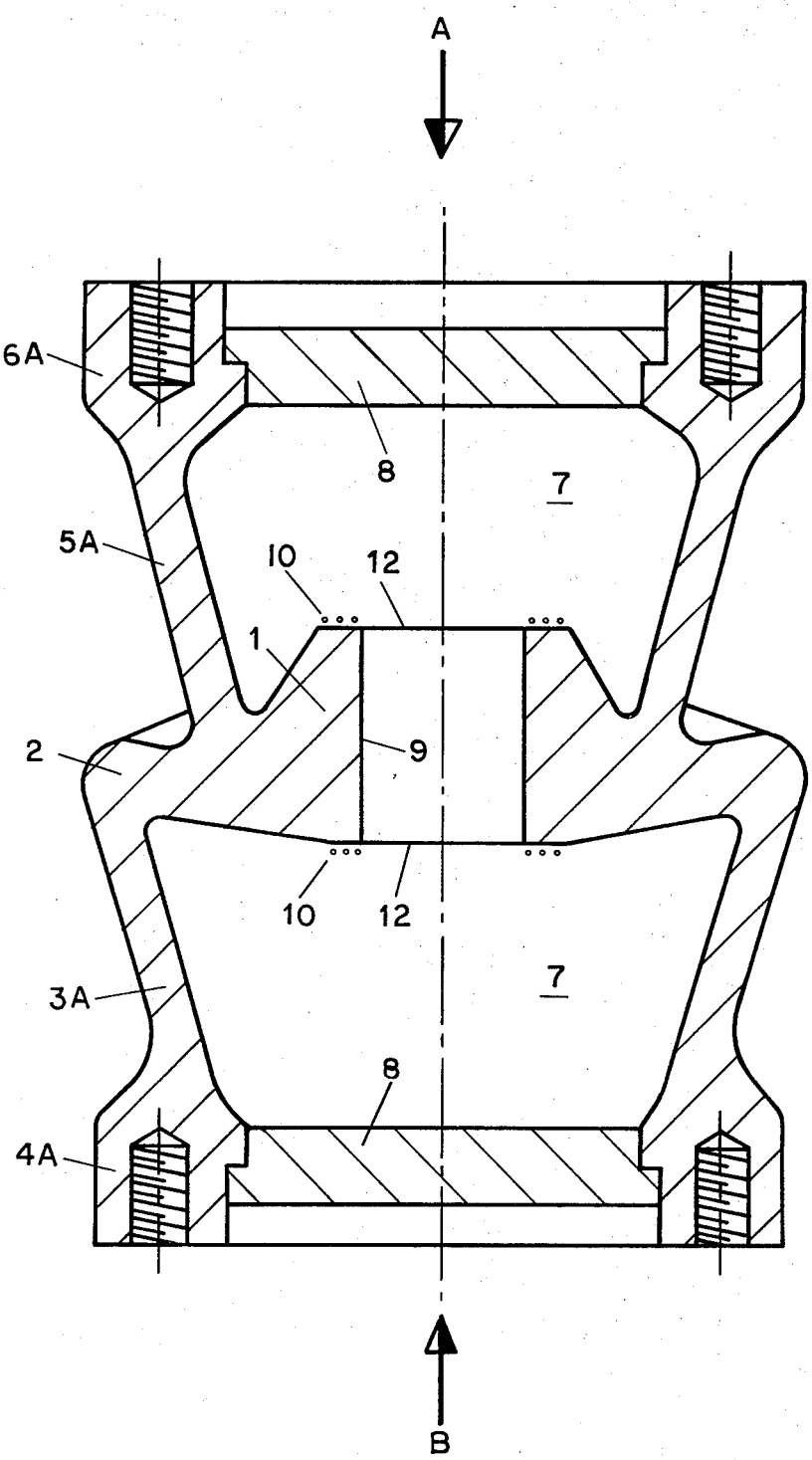

LOAD CELL

BACKGROUND OF THE INVENTION

In known load cells of the type here considered, as disclosed in German Auslegeschrift No. 1,268,878 a ring-shaped deformation body is located between two tubular bodies which serve as force input elements. One of the tubular bodies is connected to the inner circumference, and the other is connected to the outer circumference of the deformation body. Two transducer elements, such as measuring coils, are mounted near the midpoint between the two force inputs at the top and bottom of the ring-shaped deformation body.

These known load cells have a high degree of measuring accuracy and sensitivity. However, due to the mounting of one of the transducer elements on the outside of the load cell and since the diameters of the transducer elements are relatively large compared to the force input elements, they are sensitive to environmental effects, such as mechanical damage, temperature, humidity, lateral impact forces, etc., particularly under adverse operational conditions where only average measuring accuracy is required. In order to protect the externally mounted transducer element, a cover must be provided, attached to the load cell on both sides of the transducer. A force shunt is thereby introduced which, especially in the case of a mechanically strong construction, affects the measuring results.

OBJECTS OF THE INVENTION

In view of the above, it is the purpose of the present invention to provide a load cell of the above described type which is not sensitive to environmental effects and mechanical stresses, such as lateral forces and impact overloads, without reducing the measuring accuracy to levels below the required levels and without causing deviations from the desired measuring characteristics, e. g. a linear response characteristic with small hysteresis.

SUMMARY OF THE INVENTION

According to the invention there is provided a load cell having a ring-shaped deformation body which, by its deformation under the influence of a force to be measured provides a quantitative measure of this force. Mechanical-electrical transducers are mounted to the surface of the deformation body and axially spaced from each other. The transducers transform the deformation of the body into electrical quantities. The force to be measured is applied to the deformation body adjacent to its outer circumference. The reaction force is applied to a line radially concentrically spaced therefrom. Thus, the forces are applied at different radial distances by means of thin-walled tubular bodies which preferably form an integral structure with the deformation body. Both force input lines are located radially outside of the deformation body and are connected to each other by a substantially circular connecting member. This arrangement as taught by the invention has the advantage that the entire deformation body and the transducer elements are completely enclosed inside the load cell, thereby protecting them against environmental influences. The relatively large diameter of the tubular force input body provides the load cell with a large lateral stiffness whereby the cell is insensitive against transverse forces. Moreover, the transducer elements are located on a relatively small diameter, thereby rendering the cell substantially insensitive against impact overloads.

It has been found that load cells of this type have the same sensitivity for tension and compression forces since the hysteresis is very small and since the measuring characteristic is highly linear. Thus, these cells are particularly suited for testing machines. These load cells are very fatigue resistant even for a high output signal. The external dimensions are small because no elements are to be mounted outside of the tubular force input bodies, in particular no protective covers for the transducer elements are necessary according to the invention. A further advantage is seen in the relatively costconscious construction.

In a further embodiment of the invention it has been found to be advantageous with regard to the measuring accuracy and to the measuring characteristic to provide the deformation body with an axially extending inner boundary surface and to mount the transducer elements near the axial ends of this surface. In a preferred arrangement the ring-shaped deformation body has a triangular cross-section, the radially inner side of which extends in parallel to the axis of the body. The radially opposite corner of the triangular cross-section merges into an intermediate section, substantially along one of the input lines. In a further embodiment of the invention the inner surface of the deformation body is formed by the wall of a cylindrical bore, the transducer elements being mounted on annular surfaces at both ends of the bore. These annular surfaces are easily accessible for mounting of the transducer elements, even in the case of relatively small load cells. Alternatively the transducer elements may be mounted on the inside wall of the bore near its axial ends, since the bore can be easily produced with a high grade surface finish and accuracy.

In a further embodiment of the invention at least one of the thin-walled tubular bodies serving as the force input elements may have the shape of a truncated cone. This allows the external diameter of the force transmitting tubular body at its face end to be chosen arbitrarily, independently of the diameter of the circumferential force transmission line at the deformation body or at the intermediate connecting member. In a preferred arrangement both force transmitting tubular bodies may be shaped in the form of truncated cones such that one of the tubular bodies increases in diameter from its facing coupling flange toward the connecting member while the other tubular body tapers from its connecting flange toward the connecting member. Thus, it is possible to provide the two coupling flanges with equal diameters.

In order to obtain linear characteristics the transducer elements should be mounted at equal distances from the neutral surface or neutral axis of the ring-shaped deformation body.

In an especially advantageous embodiment of the invention the inner space surrounded by the tubular bodies of the load cell is closed off at both face ends by cover means connected to the coupling flanges. Thus, a simple structural feature provides a complete closure of the inner space of the load cell containing the deformation body and the transducer elements without affecting the measurement result, since the cover means are both located in an area which is not deformed during force measurement.

BRIEF FIGURE DESCRIPTION

In order that the invention may be clearly understood, it will now be described, by way of example, with reference to the accompanying drawings, wherein:

FIG. 3 shows a load cell with truncated cone shaped force transmitting tubular bodies and coupling flanges of equal diameter.

DETAILED DESCRIPTION OF EXAMPLE EMBODIMENTS

Figure 1:
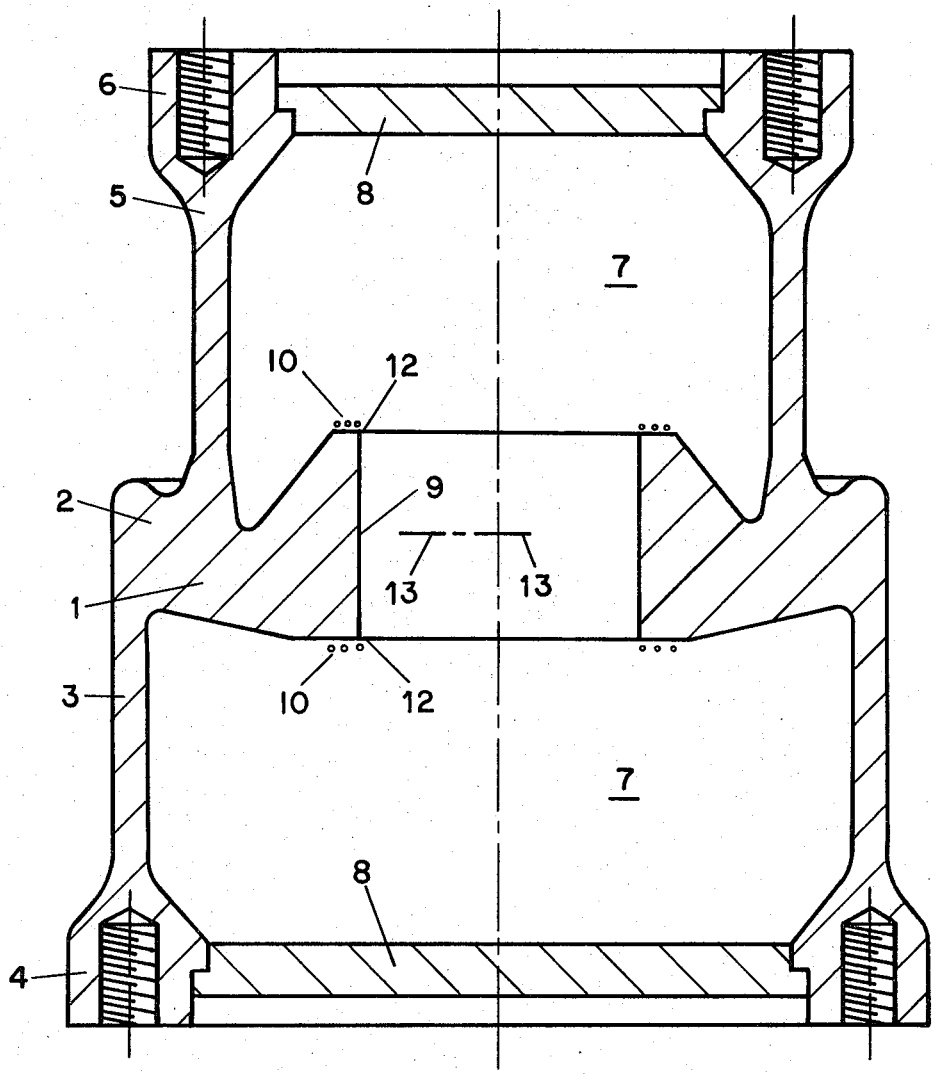
FIG. 1 shows a load cell with cylindrical tubular bodies for the transmission of the force to the deformation body having measuring coils mounted on its annular surfaces, in accordance with one embodiment of the invention.

In all of the illustrated example embodiments of the present load cells the deformation body 1 comprises a ring having an essentially triangular cross section, the outwardly extending apex of which merges into an essentially ring-shaped intermediate member 2 to form an integral unit. The outer circumference of the intermediate member 2 is integrally connected to a thin-walled cylindrical tubular body 3 (FIGS. 1 and 2) which terminates at its facing end in a coupling flange 4. A second force transmitting thin-walled tubular body 5 (FIGS. 1 and 2) is also integrally attached to the deformation body 1 by the intermediate member 2 and is provided at its end face with a coupling flange 6.

Figure 2:
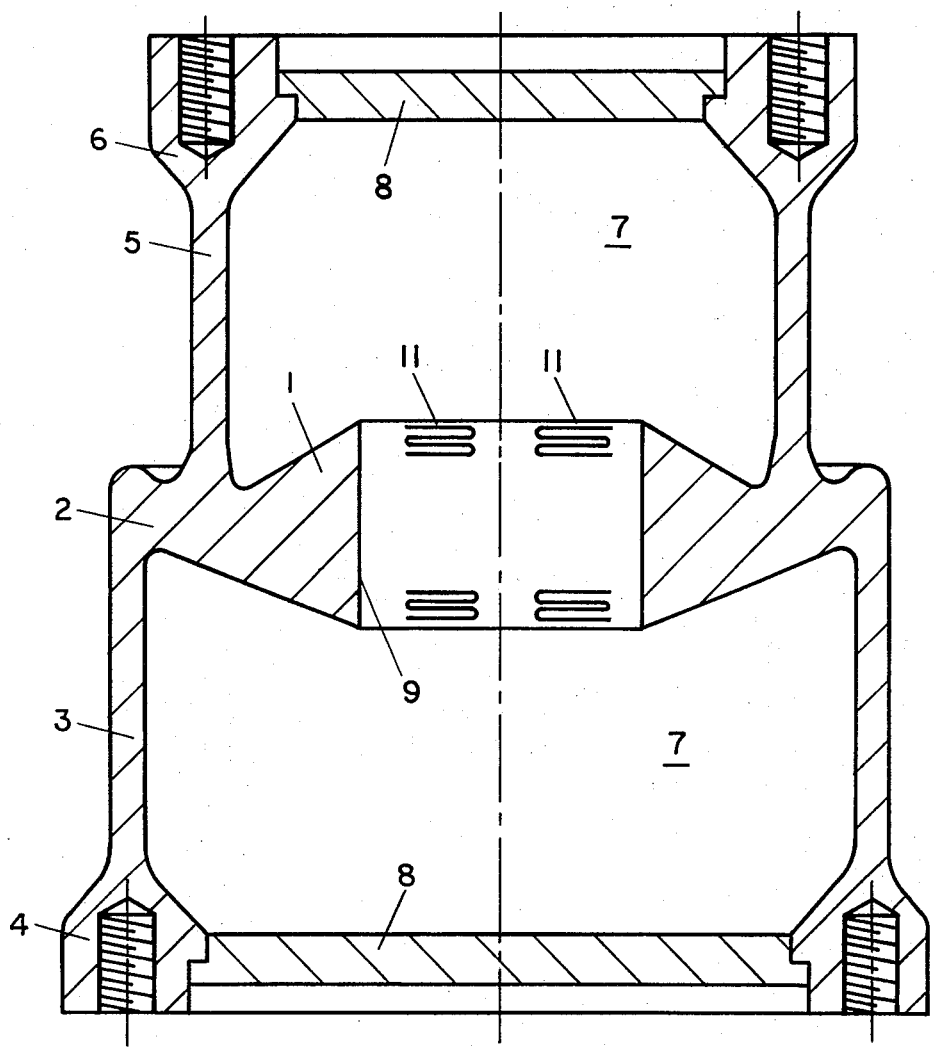
FIG. 2 shows a similar load cell in which, however, strain gauge strips are mounted on the wall of the cylindrical bore near the axial ends of the deformation body.

In the embodiments of the invention as illustrated in FIGS. 1 and 2, having cylindrical tubular bodies 3 and 5 for force transmission, the two coupling flanges 4 and 6 have different diameters. In the embodiment of the invention illustrated in FIG. 3, truncated cone-shaped tubular bodies 3a and 5a are provided one of which is tapered toward the intermediate member 2, while the other one expands from the intermediate section, so that the respective coupling flanges have equal diameters.

The inner space 7 surrounded by the tubular bodies 3 and 5 or 3a and 5a, respectively, is closed by lids 8.

The deformation body 1 is bounded on the inside by a cylindrical bore 9 which defines a side of the triangular cross section of the body 1. Mechanical-electrical transducers are attached to the deformation body near both ends of this bore 9. In the embodiments of FIGS. 1 and 3, these transducers are measuring coils 10 which are cemented to the finished annular faces 12 at the ends of the bore 9. In the embodiment of FIG. 2 such finished facing surfaces are not provided. In this arrangement strain gauge strips 11 are cemented to the wall of the bore 9 near the axial ends of the bore. The electrical conductors for the transducers 10 or 11 extend to the outside of the cell in the conventional way, e.g., via holes (not shown) in the tubular bodies 3, 5, 3a or 5a.

Under the influence of a force acting in the direction of arrow A via the tubular body 5 or 5a respectively, and a counterforce acting in the direction of arrow B via the tubular body 3 or 3a, respectively, the deformation body 1 is twisted in such a way that the diameter of the bore 9 is reduced at one end and enlarged at the other end. The transducer elements 10 or 11, respectively, attached at the annular faces 12 or the walls of the bore 9, are thereby compressed or expanded.

In order to obtain optimal linearity under tension as well as compression forces, the ring-shaped deformation body 1 must be formed in such a way that the neutral axis, indicated by line 13 in FIG. 1, at the inner diameter of the deformation body 1, which is not affected by the deformation, is located exactly in the middle between the attachment points of the transducer elements 10 or 11, respectively.

If, however, a progressive or regressive characteristic is desired, this may be achieved by displacing the neutral surface or neutral axis 13 either up or down by suitable shaping of the ring-body 1.

The mechanical-electrical transducers may consist of electrical resistance strips, coils, semiconductor strips, etc. Any number of such elements may be distributed around the circumference.

Since the transducer elements are attached to an element having a much smaller diameter than that of the force transmitting tubular bodies 3, 5, 3a and 5a, the measuring displacement of the load cell is very small. It depends primarily on the deformation displacement of the transducer carrying areas of the deformation body 1 as required to achieve a desired measuring effect. If, for instance, the mean diameter of the transducer carrying annular surfaces 10 or 11 is 50 mm and the diameter change under nominal load in the direction of the arrows A and B is 0.1 percent, the deformation induced displacement in diameter is 0.05 mm, i. e., every point on the mean diameter of the transducer carrying annular surface, e.g., 12, moves toward the center axis of the cell by 0.025 mm. Correspondingly, the displacement of the mean diameter of the opposite ring surface is 0.025 mm away from the center axis. Under tension loads the displacements are in the opposite direction. Small displacements are advantageous in terms of the deformation of the critical zones, i. e., the areas of the force transmission from the tubular bodies to the deformation body. By keeping the deformation of the transition radii small the fatigue resistance is increased. Aside from these advantages, small displacements are an absolutely necessary requirement for many applications. The larger the diameter of the ring face carrying the transducers, the larger the displacement required for the same measuring effect. This is, for instance, exemplified in those cases, in which the deformation body is located between the force transmitting tubular bodies. It should be noted here that the diameters of the force transmitting tubular bodies and their respective connecting flanges depend on the rated loads to be handled.

The load cells in accordance with the present invention have great fatigue resistance and their characteristics are linear under tension and compression loads, with very little hysteresis and relatively small displacements. The transverse stiffness is great, even in small sized load cells according to the invention, and the cost of producing the elements is reduced. The transducer elements are practically damageproof while environmental effects due to temperature, humidity, dirt, etc., are also practically eliminated.

Further, the present load cells have the same sensitivity for tension and compression forces.

Although the invention has been described with reference to specific example embodiments, it will be appreciated that it is intended to cover all modifications and equivalents within the scope of the appended claims.

What is claimed is:

1. A load cell comprising a ring-shaped intermediate member, a pair of tubular members concentric with said intermediate member and extending from said intermediate member in opposite directions at different radii, for transmitting forces to said intermediate member, a ring-shaped deformation member circumferentially connected to said intermediate member and extending inwardly therefrom, whereby axially directed forces in said tubular members are substantially radially outside of said deformation member, and are transmitted to said deformation member by way of said intermediate member, and mechanical-electrical transducer means on said deformation member radially inwardly of said tubular members.

2. The load cell of claim 1, wherein said tubular members, intermediate member and deformation member are integrally connected to form a single element.

3. The load cell of claim 1, wherein said tubular members are thin-walled tubes.

4. The load cell of claim 1, wherein said deformation member is defined by an inner axially extending surface, said mechanical-electrical transducer means comprising transducer elements affixed to surfaces of said deformation member adjacent opposite axial ends of said inner surface.

5. The load cell of claim 4, wherein said deformation member has a triangular cross section, one side of said triangular cross sections defining said inner axially extending surface and being parallel to the axis of said deformation member, the apex of said triangular cross section opposite said one side extending outwardly to form a transition with said intermediate section and being located substantially in line with forces transmitted to said intermediate member from one of said tubular members.

6. The load cell of claim 4, wherein said inner surface is comprised of a cylindrical bore, said deformation member having angular surfaces adjacent said bore, said transducer means being affixed to said angular surfaces.

7. The load cell of claim 4, wherein said inner surface is comprised of a cylindrical bore, said transducer means comprising separate transducer elements affixed to said inner surface adjacent opposite axial ends of said cylindrical bore.

8. The load cell of claim 1, wherein one of said tubular members has a shape of a truncated cone.

9. The load cell of claim 1, wherein both of said tubular members are in the form of truncated cones, further comprising a pair of coupling flanges connected to said tubular members, one of said tubular members tapering inwardly from its respective coupling flange to said intermediate member, the other of said tubular members tapering radially inwardly from said intermediate member to its respective coupling flange.

10. The load cell of claim 9, wherein said coupling flanges have equal diameters.

11. The load cell of claim 1, wherein said intermediate member has a neutral surface, said transducer comprising a pair of transducer elements mounted on said deformation member at equal distances and in opposite directions from the neutral surface of said deformation member.

12. The load cell of claim 1, wherein said tubular members have open ends, said load cell further comprising closure means for closing the open ends of said tubular members.

13. In a load cell having a ring-shaped deformation member concentrically connected intermediate two force transmitting tubular members for coupling forces on said tubular members to said deformation member, the improvement comprising a concentric intermediate ring-shaped member joined to the outer circumference of said deformation member and to the inner circumference of said tubular members whereby the latter are coupled to said intermediate member at different radii, and mechanical-electrical transducer means coupled to said deformation member radially inwardly of said tubular members.

* * * * *